United States Patent
Chaponniere et al.

(10) Patent No.: US 11,758,430 B2
(45) Date of Patent: Sep. 12, 2023

(54) PROCESSING MAPPED 5G SYSTEM (5GS) QUALITY OF SERVICE (QOS) INFORMATION IN EVOLVED PACKET SYSTEM (EPS)

(71) Applicant: QUALCOMM Incorporated, San Diego, CA (US)

(72) Inventors: Lenaig Genevieve Chaponniere, La Jolla, CA (US); Can Zhao, San Diego, CA (US); Rakshith Sundareshan, San Diego, CA (US); Ajinkya Ashok Ghodke, San Diego, CA (US); Liping Shen, San Diego, CA (US); Feilu Liu, San Diego, CA (US); Suli Zhao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/929,868

(22) Filed: Sep. 6, 2022

(65) Prior Publication Data

US 2022/0417788 A1 Dec. 29, 2022

Related U.S. Application Data

(63) Continuation of application No. 17/199,816, filed on Mar. 12, 2021, now Pat. No. 11,516,699.
(Continued)

(51) Int. Cl.
*H04W 28/12* (2009.01)
*H04W 28/02* (2009.01)

(52) U.S. Cl.
CPC ....... *H04W 28/0268* (2013.01); *H04W 28/12* (2013.01)

(58) Field of Classification Search
CPC . H04W 28/12; H04W 28/0268; H04W 76/22; H04W 76/11
See application file for complete search history.

(56) References Cited

U.S. PATENT DOCUMENTS 10,873,989 B1 12/2020 Pan et al.
2019/0174449 A1* 6/2019 Shan ............... H04W 60/00
(Continued)

FOREIGN PATENT DOCUMENTS

WO WO-2020147699 A1 7/2020
WO WO-2020169021 A1 8/2020

OTHER PUBLICATIONS

Ericsson, et al., "Interworking of Ethernet PDU Session to Ethernet PDN Connection", 3GPP TSG CT WG1 Meeting #116, 3GPP Draft; C1-192009, 24501_CR0936_(REL-16)_C1-192009, 3rd Generation Partnership Project (3GPP), Mobile Competence Centre; 650, Route Des Lucioles; F-06921 Sophia-Antipolis Cedex; France, vol. CT WG1, No. Xi 'an (P.R. of China); Apr. 8, 2019-Apr. 12, 2019, 31 Pages, May 27, 2019 (May 27, 2019), XP051738627, Retrieved from the Internet: URL: http://www.3gpp.org/ftp/tsg%5Fct/TSG%5FCT/TSGC%5F84%5FNewport%5FBeach/Docs/CP%2D191147%2Ezip [retrieved on May 27, 2019] p. 1-p. 31.
(Continued)

*Primary Examiner* — Syed Ali
(74) *Attorney, Agent, or Firm* — QUALCOMM Incorporated

(57) ABSTRACT

Aspects of the present disclosure provide apparatus, methods, processing systems, and computer readable mediums for updating QoS configurations at a user equipment (UE). An example method generally includes receiving, from a network entity, quality of service (QoS) information, a QoS identifier associated with the QoS information, and a bearer context associated with the QoS information in one of a modify bearer context request message, an activate default
(Continued)

bearer context request message, or an activate dedicated bearer context request message; and updating a QoS configuration using the QoS information based on whether the UE is already configured with QoS information associated with the QoS identifier for a bearer context different from the bearer context associated with the QoS information received in the modify bearer context request message, activate default bearer context request message, or activate dedicated bearer context request message.

26 Claims, 7 Drawing Sheets

Related U.S. Application Data

(60) Provisional application No. 63/007,262, filed on Apr. 8, 2020.

(56) References Cited

U.S. PATENT DOCUMENTS

| | | |
|---|---|---|
| 2019/0306761 A1 | 10/2019 | Jin et al. |
| 2020/0015116 A1 | 1/2020 | Huang et al. |
| 2020/0178145 A1 | 6/2020 | Han et al. |
| 2020/0322831 A1 | 10/2020 | Xu et al. |
| 2020/0322834 A1 | 10/2020 | Huang-Fu et al. |
| 2021/0168669 A1 | 6/2021 | Geng et al. |
| 2021/0168882 A1 | 6/2021 | Chang et al. |
| 2021/0297904 A1* | 9/2021 | Watfa .............. H04W 12/10 |
| 2021/0321287 A1 | 10/2021 | Chaponniere et al. |
| 2022/0132372 A1* | 4/2022 | Narasimha .......... H04W 28/085 |
| 2022/0256436 A1* | 8/2022 | Guo ................. H04W 40/36 |
| 2022/0312481 A1* | 9/2022 | Talarico ............ H04W 72/0446 |

OTHER PUBLICATIONS

International Search Report and Written Opinion—PCT/US2021/022257—ISA/EPO—dated Jun. 8, 2021.

Mediatek Inc: "Correction on Handling IM CN Subsystem Signaling Flag", 3GPP TSG-CT WG1 Meeting #117, 3GPP Draft; C1-193384_[24.501] [R15] IM CN Signaling, 3rd Generation Partnership Project (3GPP), Mobile Competence Centre; 650, Route Des Lucioles; F-06921 Sophia-Antipolis Cedex; France, vol. CT WG1, No. Reno (NV), USA; May 13, 2019-May 17, 2019, 20 Pages, May 6, 2019 (May 6, 2019), XP051706000, Retrieved from the Internet: URL: http://www.3gpp.org/ftp/tsg%5Fct/WG1%5Fmm%2Dcc%2Dsm%5Fex%2DCN1/TSGC1%5F117%5FReno/Docs/C1%2D193384%2Ezip [retrieved on May 6, 2019] p. 1-p. 20.

Qualcomm Incorporated, et al., "Additional QoS Error Handling Related to Mapped EBI", 3GPP TSG-CT WG1 Meeting #123-e, 3GPP Draft; C1-202874, Electronic Meeting, 3rd Generation Partnership Project (3GPP), Mobile Competence Centre; 650, Route Des Lucioles; F-06921 Sophia-Antipolis Cedex; France, vol. CT WG1, No. Online Meeting; Apr. 16, 2020-Apr. 24, 2020, 13 Pages, Apr. 23, 2020 (Apr. 23, 2020), XP051878086, Retrieved from the Internet: URL: https://ftp.3gpp.org/tsg_ct/WG1_mm-cc-sm_ex-CN1/TSGC1_123e/Docs/C1-202874.zipC1-202874.docx [retrieved on Apr. 23, 2020] p. 1-p. 13.

* cited by examiner

| Case # | EPS message | Mapped 5G QoS information | Pre-conditions |
|---|---|---|---|
| 1 | ACTIVATE DEDICATED EPS BEARER CONTEXT REQUEST received on EPS bearer EBI=6 | • Create QoS flow Description with QFI=1<br>• Mapped EBI in the received QoS flow Description is 6 or mapped EBI is omitted | • QFI=1 has been mapped to EBI=5<br>• EBI=5 and EBI=6 belong to the same PDN connection |
| 2 | MODIFY EPS BEARER CONTEXT REQUEST received on EPS bearer EBI=6 | • Create QoS flow Description with QFI=1<br>• Mapped EBI in the received QoS flow Description is 6 or mapped EBI is omitted | • QFI=1 has been mapped to EBI=5<br>• EBI=5 and EBI=6 belong to the same PDN connection |
| 3 | MODIFY EPS BEARER CONTEXT REQUEST received on EPS bearer EBI=6 | • Modify QoS flow Description with QFI=1<br>• Mapped EBI in the received QoS flow Description is 6 or mapped EBI is omitted | • QFI=1 has been mapped to EBI=5<br>• EBI=5 and EBI=6 belong to the same PDN connection |
| 4 | MODIFY EPS BEARER CONTEXT REQUEST received on EPS bearer EBI=6 | • Delete QoS flow Description with QFI=1<br>• Mapped EBI in the received QoS flow Description is 6 or mapped EBI is omitted | • QFI=1 has been mapped to EBI=5<br>• EBI=5 and EBI=6 belong to the same PDN connection |
| 5 | MODIFY EPS BEARER CONTEXT REQUEST received on EPS bearer EBI=6 | Create QoS rule with QRI=1 | • QRI=1 QoS rule exists and was associated with EBI=5 (QRI 1 <=> QFI 1 <=> EBI 5)<br>• EBI=5 and EBI=6 belong to the same PDN connection |
| 6 | MODIFY EPS BEARER CONTEXT REQUEST received on EPS bearer EBI=6 | Modify QoS rule with QRI=1 | • QRI=1 QoS rule exists and was associated with EBI=5 (QRI 1 <=> QFI 1 <=> EBI 5)<br>• EBI=5 and EBI=6 belong to the same PDN connection |
| 7 | MODIFY EPS BEARER CONTEXT REQUEST received on EPS bearer EBI=6 | Delete QoS rule with QRI=1 | • QRI=1 QoS rule exists and was associated with EBI=5 (QRI 1 <=> QFI 1 <=> EBI 5)<br>• EBI=5 and EBI=6 belong to the same PDN connection |

FIG. 5

PROCESSING MAPPED 5G SYSTEM (5GS) QUALITY OF SERVICE (QOS) INFORMATION IN EVOLVED PACKET SYSTEM (EPS)

CROSS-REFERENCE TO RELATED APPLICATIONS

This application is a continuation of U.S. patent application Ser. No. 17/199,816, entitled "Processed Mapped 5G System Quality of Service (QoS) Information in Evolved Packet System (EPS)", filed Mar. 12, 2021, which claims priority to and benefit of U.S. Provisional Patent Application No. 63/007,262, entitled "Processed Mapped 5G System Quality of Service (QoS) Information in Evolved Packet System (EPS)", filed Apr. 8, 2020, both of which are assigned to the assignee hereof, the contents of both which are incorporated by reference in its entirety.

TECHNICAL FIELD

Aspects of the present disclosure relate to wireless communications, and more particularly, to techniques for updating quality of service (QoS) parameters in an environment where devices using a first radio access technology and devices using a second radio access technology coexist.

BACKGROUND

Wireless communication systems are widely deployed to provide various telecommunication services such as telephony, video, data, messaging, broadcasts, etc. These wireless communication systems may employ multiple-access technologies capable of supporting communication with multiple users by sharing available system resources (for example, bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (for example, 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

A control resource set (CORESET) for systems, such as an NR and LTE systems, may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE.

SUMMARY

The systems, methods, and devices of the disclosure each have several innovative aspects, no single one of which is solely responsible for the desirable attributes.

One innovative aspect of the subject matter described in this disclosure can be implemented in a method for wireless communication by a user equipment (UE). The method generally includes receiving, from a network entity, quality of service (QoS) information, a QoS identifier associated with the QoS information, and a bearer context associated with the QoS information in one of a modify bearer context request message, an activate default bearer context request message, or an activate dedicated bearer context request message; and updating a QoS configuration using the QoS information based on whether the UE is already configured with QoS information associated with the QoS identifier for a different bearer context than the bearer context associated with the QoS information.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail some illustrative features of the one or more aspects. These features are indicative, however, of but a few of the various ways in which the principles of various aspects may be employed.

BRIEF DESCRIPTION OF THE DRAWINGS

Details of one or more implementations of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

FIG. 5 illustrates example scenarios in which mappings between quality of service (QoS) information for a network using a first radio access technology and QoS information for a network using a second radio access technology are used in activating QoS rules to a bearer context.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for updating quality of service (QoS) information in an environment where devices using a first radio access technology and devices using a second radio access technology coexist.

The following description provides examples of updating QoS information in an environment where devices using a first radio access technology and devices using a second radio access technology coexist, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
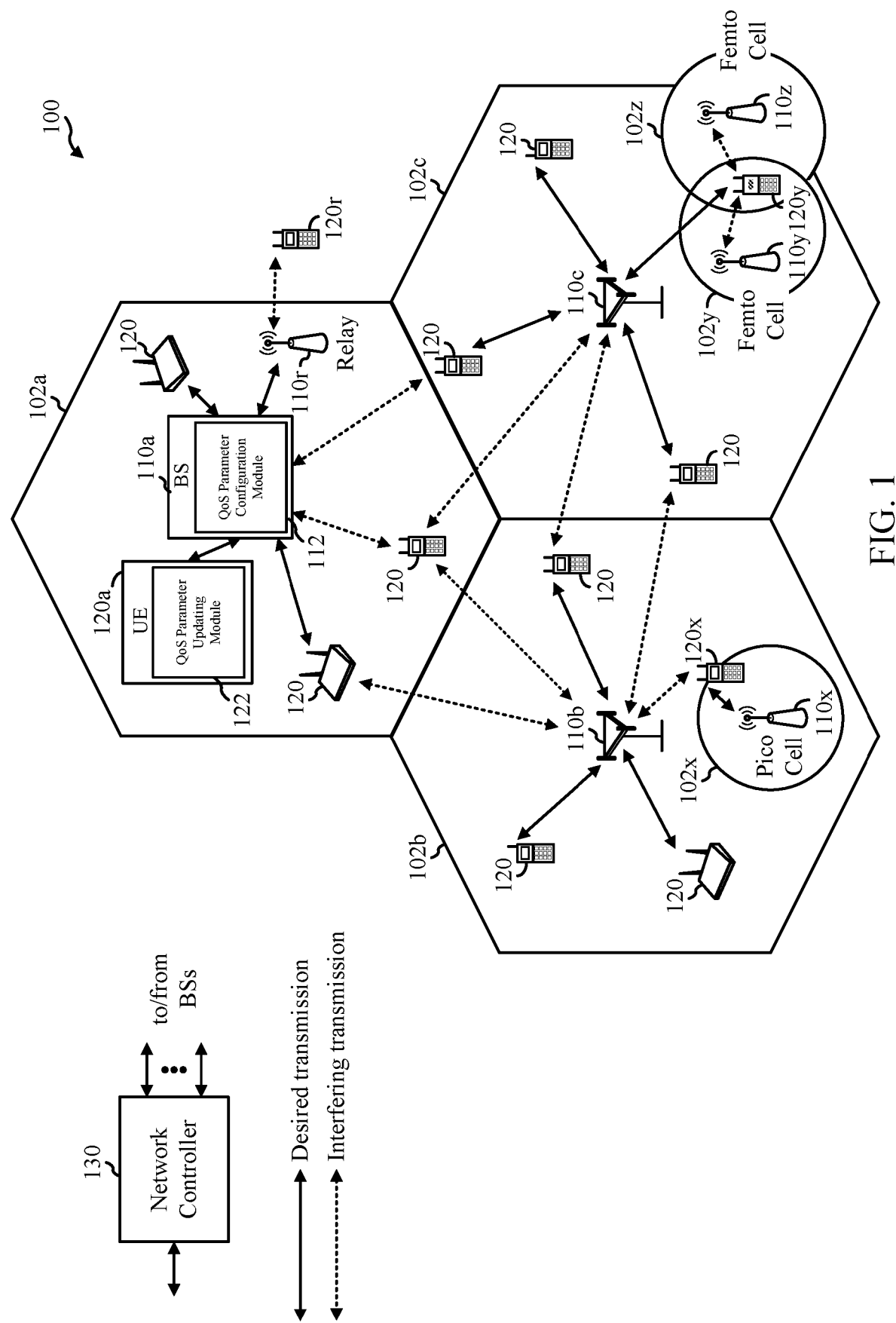
FIG. 1 shows an example wireless communication network in which some aspects of the present disclosure may be performed.

FIG. 1 illustrates an example wireless communication network 100 in which aspects of the present disclosure may be performed. For example, as shown in FIG. 1, UE 120a may include a quality of service (QoS) parameter updating module 122 that may be configured to perform (or cause UE 120a to perform) operations 400 of FIG. 4. Similarly, a base station 110a may include a QoS parameter configuration module 112 that may be configured to perform (or cause the base station 110a to perform) operations to transmit QoS configuration information to the UE.

NR access (for example, 5G NR) may support various wireless communication services, such as enhanced mobile broadband (eMBB) targeting wide bandwidth (for example, 80 MHz or beyond), millimeter wave (mmWave) targeting high carrier frequency (for example, 25 GHz or beyond), massive machine type communications MTC (mMTC) targeting non-backward compatible MTC techniques, or mission critical services targeting ultra-reliable low-latency communications (URLLC). These services may include latency and reliability requirements. These services may also have different transmission time intervals (TTI) to meet respective quality of service (QoS) requirements. In addition, these services may co-exist in the same time-domain resource (for example, a slot or subframe) or frequency-domain resource (for example, component carrier).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another or to one or more other BSs or network nodes (not shown) in wireless communication network 100 through various types of backhaul interfaces (for example, a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (for example, 120x, 120y, etc.) may be dispersed throughout the wireless communication network 100, and each UE 120 may be stationary or mobile.

Wireless communication network 100 may also include relay stations (for example, relay station 110r), also referred to as relays or the like, that receive a transmission of data or other information from an upstream station (for example, a BS 110a or a UE 120r) and sends a transmission of the data or other information to a downstream station (for example, a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (for example, directly or indirectly) via wireless or wireline backhaul.

Figure 2:
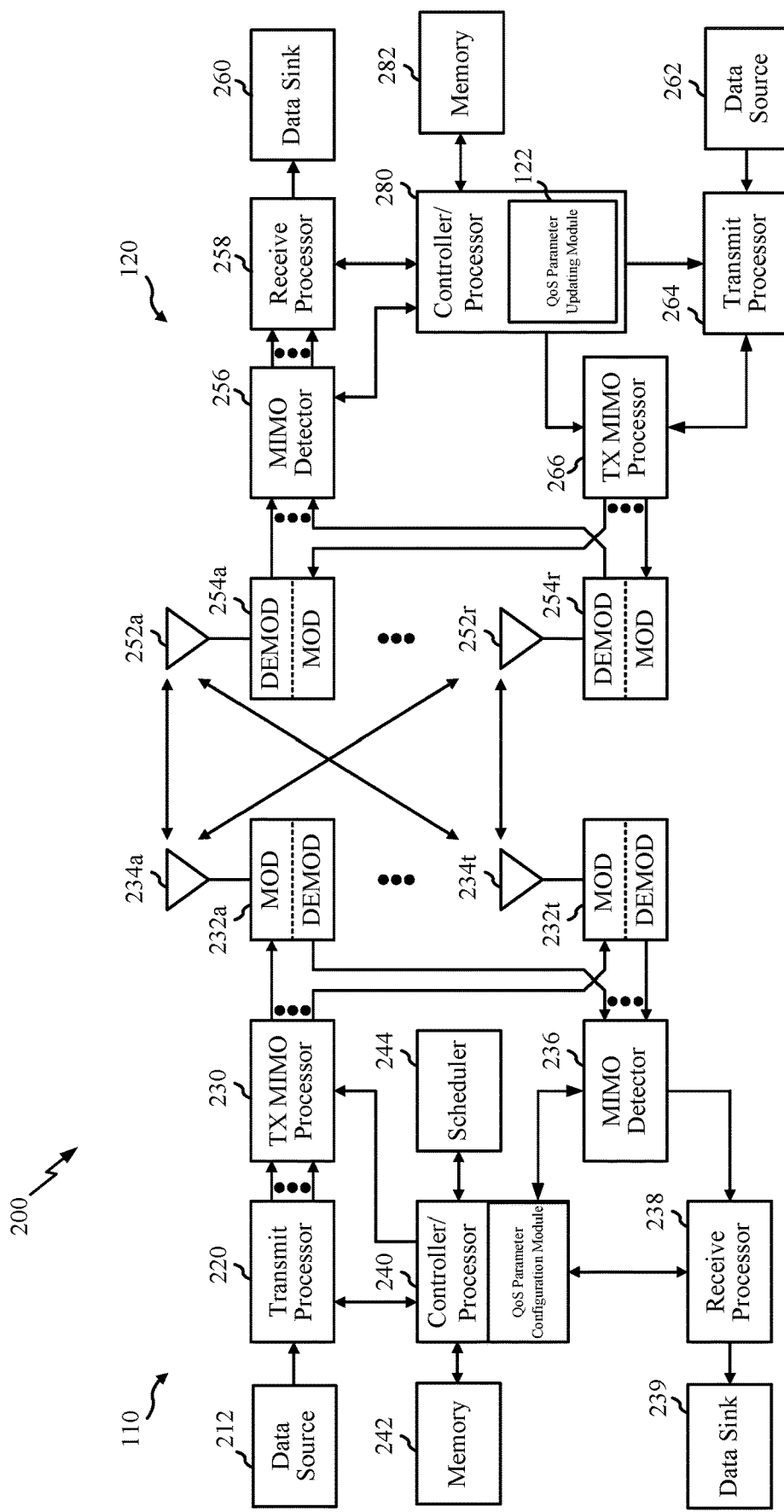
FIG. 2 shows a block diagram illustrating an example base station (BS) and an example user equipment (UE) in accordance with some aspects of the present disclosure.

FIG. 2 shows a block diagram illustrating an example base station (BS) and an example user equipment (UE) in accordance with some aspects of the present disclosure.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (for example, encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (for example, precoding) on the data symbols, the control symbols, or the reference symbols, if applicable, and may provide output symbol streams to the modulators (MODs) 232a-232t. Each modulator 232 may process a respective output symbol stream (for example, for OFDM, etc.) to obtain an output sample stream. Each modulator may further process (for example, convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (for example, filter, amplify, downconvert, and digitize) a respective received signal to obtain input samples. Each demodulator may further process the input samples (for example, for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (for example, demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (for example, for the physical uplink shared channel (PUSCH)) from a data source 262 and control information (for example, for the physical uplink control channel (PUCCH) from the controller/processor 280. The transmit processor 264 may also generate reference symbols for a reference signal (for example, for the sounding reference signal (SRS)). The symbols from the transmit processor 264 may be precoded by a TX MIMO processor 266 if applicable, further processed by the demodulators in transceivers 254a-254r (for example, for SC-FDM, etc.), and transmitted to the BS 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The memories 242 and 282 may store data and program codes for BS 110 and UE 120, respectively. A scheduler 244 may schedule UEs for data transmission on the downlink or uplink.

The controller/processor 280 or other processors and modules at the UE 120 may perform or direct the execution of processes for the techniques described herein. As shown in FIG. 2, the controller/processor 280 of the UE 120 has a QoS parameter updating module 122 that may be configured to perform operations 400 of FIG. 4, as discussed in further detail below. The controller/processor 240 of the base station 110 includes a QoS parameter configuration module that may be configured to transmit QoS configuration messages to a UE for processing. Although shown at the Controller/Processor, other components of the UE or BS may be used to perform the operations described herein.

Figure 3:
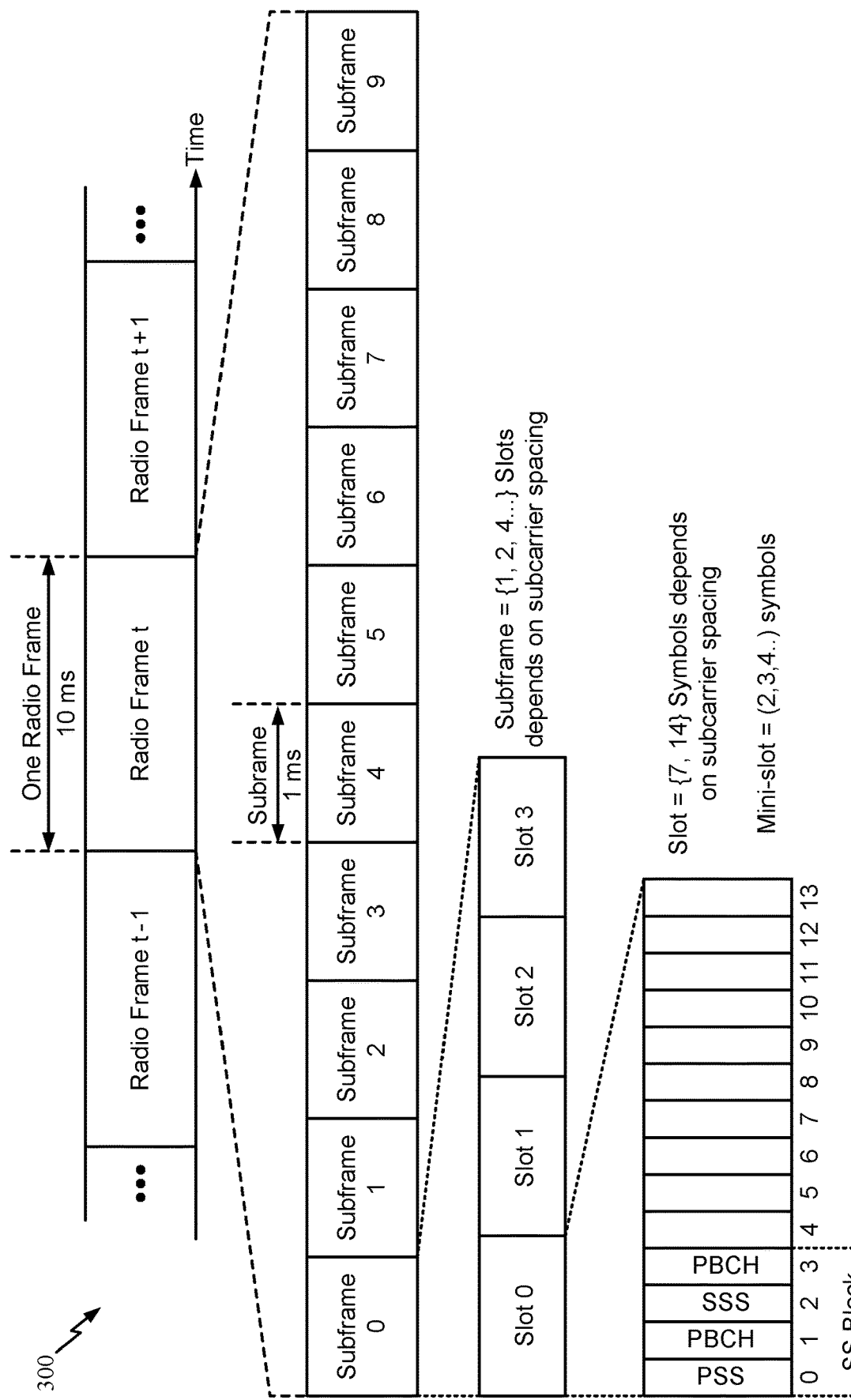
FIG. 3 illustrates an example of a frame format for a telecommunication system, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

A control resource set (CORESET) for systems, such as an NR and LTE systems, may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE. According to aspects of the present disclosure, a CORESET is a set of time and frequency domain resources, defined in units of resource element groups (REGs). Each REG may comprise a fixed number (e.g., twelve) tones in one symbol period (e.g., a symbol period of a slot), where one tone in one symbol period is referred to as a resource element (RE). A fixed number of REGs may be included in a control channel element (CCE). Sets of CCEs may be used to transmit new radio PDCCHs (NR-PDCCHs), with different numbers of CCEs in the sets used to transmit NR-PDCCHs using differing aggregation levels. Multiple sets of CCEs may be defined as search spaces for UEs, and thus a NodeB or other base station may transmit an NR-PDCCH to a UE by transmitting the NR-PDCCH in a set of CCEs that is defined as a decoding candidate within a search space for the UE, and the UE may receive the NR-PDCCH by searching in search spaces for the UE and decoding the NR-PDCCH transmitted by the NodeB.

Example Methods for Updating Quality of Service (QoS) Information for Operations in a First Radio Access Technology while Connected to a Network Entity Using a Second Radio Access Technology Aspects of the present disclosure provide apparatus, methods, processing systems, and computer readable mediums for updating quality of service (QoS) information in an environment where devices using a first radio access technology and devices using a second radio access technology coexist.

In LTE networks using the Evolved Packet System (EPS), QoS may be achieved by applying different parameters to different EPS bearer contexts within a packet data network (PDN) connection to a network entity identified by an access point name (APN). Similarly, in NR networks using the 5G System (5GS), QoS may be achieved by applying different parameters to QoS flows within a packet data unit (PDU) session with a network entity identified by a data network name (DNN). In an environment where a network using a first radio access technology (e.g., LTE) and a network using a second radio access technology (e.g., NR) coexist and a UE can operate on either network, mappings between EPS and 5GS session management parameters may allow for QoS information to be shared across different networks. For example, PDN connection information in EPS QoS information may correspond to PDU session information in 5GS QoS information; EPS bearer information in EPS QoS information may correspond to QoS flow information in 5GS QoS information; APN information may correspond to a DNN; and a traffic flow template (TFT) for an EPS bearer in EPS QoS information may correspond to one or more QoS rules for a QoS flow in 5GS QoS information.

Generally, mapped 5GS QoS information may include QoS flow descriptions and QoS flow rules. A QoS flow description generally includes a QoS Flow Identifier (QFI), an operation code, and one or more other parameters. The QFI may identify a specific operation to be performed in respect of the QoS information, such as creating a new QoS flow description, deleting an existing QoS flow description, or modifying a QoS flow description. The one or more other parameters may include a 5G QoS Identifier (5QI), guaranteed flow bit rate for the uplink (GFBR UL), guaranteed flow bit rate for the downlink (GFBR DL), maximum flow bit rate for the uplink (MFBR UL), maximum flow bit rate for the downlink (MFBR DL), an averaging window, and an EPS bearer identity (EBI). The QoS flow rules may include a QoS rule identifier, a rule operation code, an indication of whether the QoS rule is the default QoS rule, packet filters, a QoS rule precedence, and a QFI.

Figure 4:
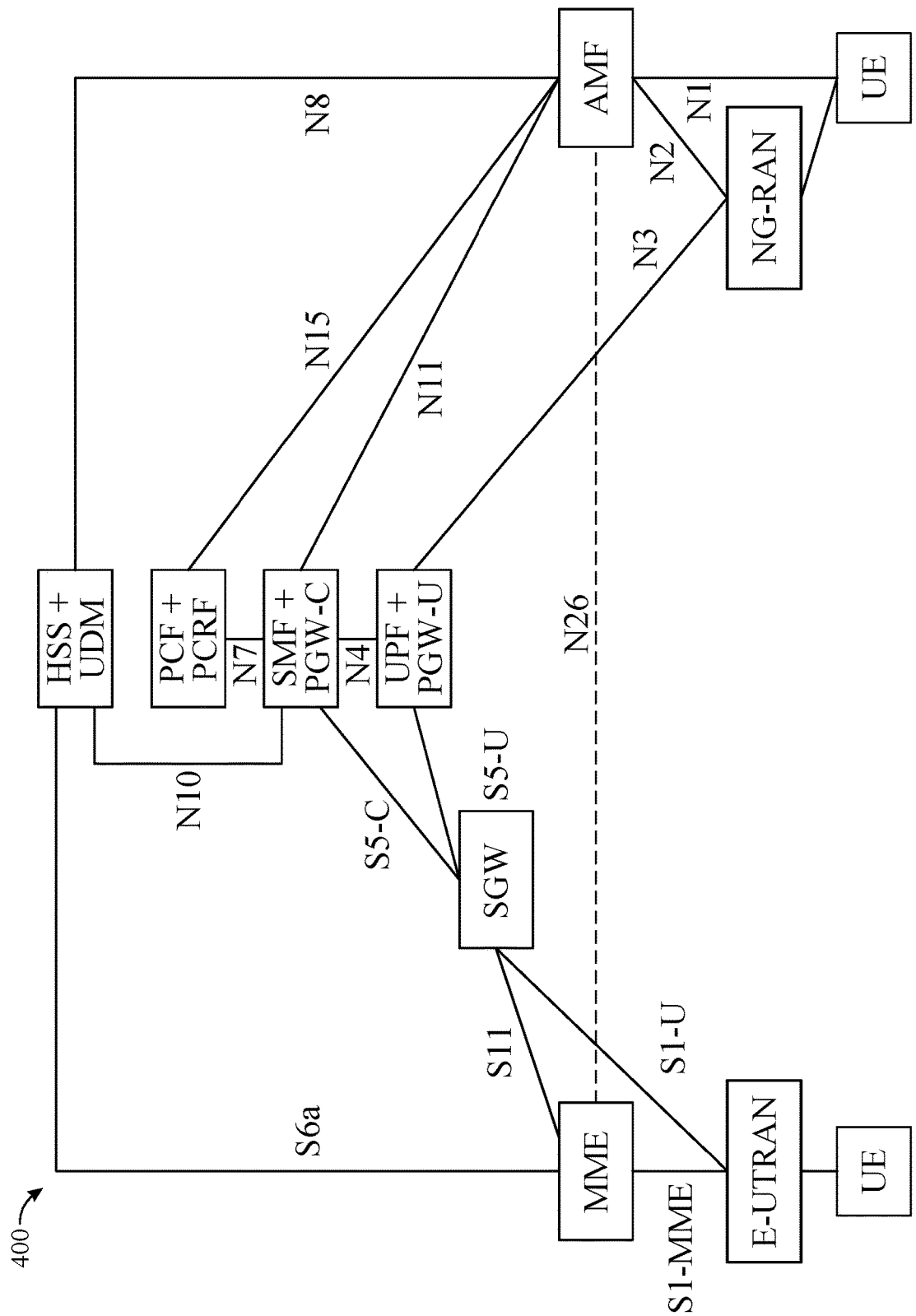
FIG. 4 illustrates interworking between a network operating using a first radio access technology and a network operating using a second radio access technology.

FIG. 4 illustrates an example network in which interworking is established between an LTE and an NR network. When a PDN connection is established in the LTE network and an interface connecting the LTE and NR networks is present (e.g., the N26 interface), the network may transmit, to a UE, mapped 5GS QoS information for each EPS bearer being activated. By transmitting the mapped QoS information for each EPS bearer being activated, a UE may know which QoS flows to create and which QoS parameters to apply if and when the data session is transferred from an LTE to an NR network. The network may also update the mapped 5GS QoS information during EPS bearer context modification. The activation and modification of QoS information may be carried, for example, in a Protocol Configuration Options (PCO) or enhanced PCO (ePCO) information element in various messages, such as the ACTIVATE DEFAULT EPS BEARER CONTEXT REQUEST, ACTIVATE DEDICATED EPS BEARER CONTEXT REQUEST, or MODIFY EPS BEARER CONTEXT REQUEST messages.

The mapping between 5GS QoS information and the corresponding EPS bearer may be performed based on the inclusion of the EBI in the mapped 5G QoS information. To simplify processing at a UE, the network may only include mapped 5GS QoS information corresponding to the EPS bearer context that is being activated or modified. If the EBI is omitted in the mapped 5G QoS information, the UE may assume that the mapped 5GS QoS information is associated with the EPS bearer context that is being activated or modified. Otherwise, if the EBI is included in the mapped 5GS QoS information and the included EBI is not the EBI of the mapped bearer context that is being activated or modified, the UE may discard the mapped 5G QoS information and report an error to the network.

In some cases, however, problems may arise with the inclusion of mapped 5GS QoS information in an activation or modification message. If the mapped 5GS QoS information (1) does not include an EBI or includes the EBI of the active EPS bearer, and (2) includes QoS rules or QoS flow descriptions already associated with an EPS bearer context other than the EPS bearer context being activated or modified, the processing of such information may cause the UE to apply the specified operation (e.g., QoS rule creation) to the EPS bearer context being activated or modified and to delete the QoS rule or QoS flow description associated with the EPS bearer context other than the EPS bearer context being activated or modified. In doing so, the UE may not report an error to the network. In these cases, EPS bearer contexts not being activated or modified may be impacted unintendedly.

FIG. 5 illustrates example scenarios in which mapped 5GS QoS information may cause an unintended impact to QoS configurations associated with other EPS bearer contexts. For example, in a first example, the UE may receive an ACTIVATE DEDICATED EPS BEARER CONTEXT REQUEST message on EPS bearer 6, and the mapped QoS information in the message includes a QFI of 1 and an omitted mapped EBI or an EBI of 6. The UE may apply the EPS creation for EPS bearer 6. However, because QFI 1 has been mapped to EBI 5, the UE may delete the QoS flow for EPS bearer 5, which the UE is not supposed to modify.

Figure 6:
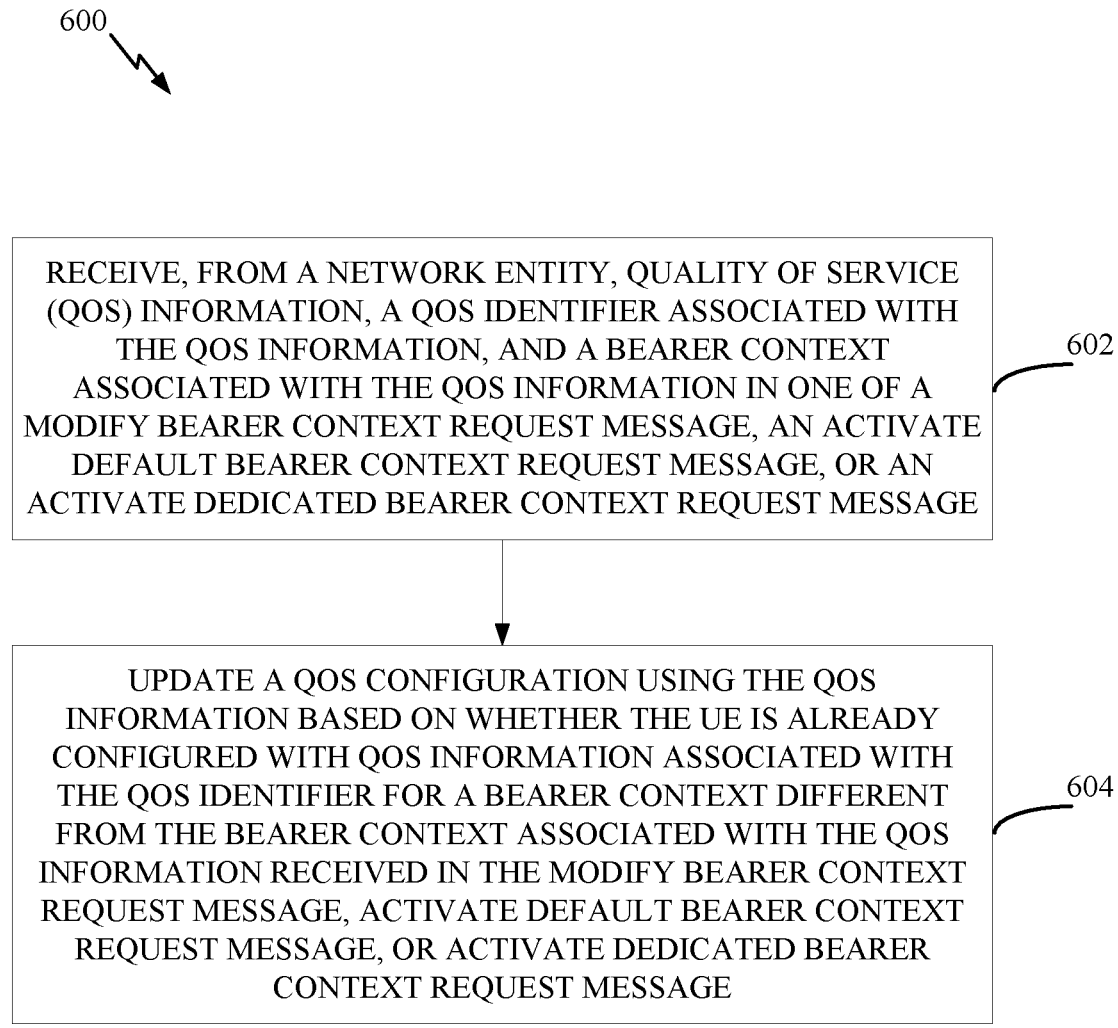
FIG. 6 illustrates example operations for wireless communication by a user equipment (UE), in accordance with some aspects of the present disclosure.

FIG. 6 illustrates example operations that may be performed by a user equipment to update a QoS configuration based on mapped 5GS QoS information. Generally, operations 600 may be performed when the UE executes an operation on the received 5GS mapped QoS information or deletes an existing QoS rule and/or QoS flow description, and the existing QoS rule and/or QoS flow description is associated with (e.g., mapped to) the EPS bearer context being activated or modified.

As illustrated, operations 600 begin at block 602, where the UE receives, from a network entity, quality of service (QoS) information, a QoS identifier associated with the QoS information, and a bearer context associated with the QoS information. The QoS information, QoS identifier, and the bearer context associated with the QoS information may be received in one of a modify bearer context request message, an activate default bearer context request message, or an activate dedicated bearer context request message. Generally, the QoS information may be associated with a QoS rule identifier or a QoS flow identifier, and the QoS rule identifier or QoS flow identifier may be associated with an EPS bearer context based on a mapping between the QoS rule identifier or QoS flow identifier and the EPS bearer context.

At block 604, the UE updates a QoS configuration using the QoS information based on whether QoS information associated with the QoS identifier is already configured for a bearer context different from the bearer context associated with the QoS information included in the received message (e.g., the modify bearer context request message, the activate default bearer context request message, or the an activate dedicated bearer context request message).

In some embodiments, the QoS information and the received QoS information may be associated with different bearer contexts. The QoS information and the received QoS information may belong to the same or different PDN connections.

In some embodiments, the QoS information, the QoS identifier associated with the QoS information, and the bearer context associated with the QoS information is received in a MODIFY EPS BEARER CONTEXT REQUEST message. The rule operation may specify that the UE is to create a new QoS rule, modify an existing QoS rule and add packet filters, modify an existing QoS rule and replace all packet filters, or modify an existing QoS rule without modifying packet filters. If there is already an existing QoS rule with the same QoS rule identifier, and the QoS rule identifier is associated with a QoS flow description stored for an EPS bearer context other than the EPS bearer context identified in the message, the UE may not perform the rule operation and may discard the QoS rule information. The UE may report an error to a network entity. The report may be carried, for example, in a PCO or ePCO IE with an indication that a semantic error exists in the QoS operation. In some embodiments, the PCO or ePCO IE may be transmitted in a MODIFY EPS BEARER CONTEXT ACCEPT message.

In some embodiments, a flow description operation may specify that a UE is to create a new QoS flow description, modify an existing QoS flow description, or delete an existing QoS flow description. If there is already an existing QoS flow description with the same QoS flow identifier as that included in the request and the QoS flow identifier is stored for an EPS bearer context different from the EPS bearer context identified in the message (i.e., the EPS bearer context being modified), the UE may not perform the flow description operation and may discard the flow description information. The UE may report an error to a network entity. The error may be carried, for example, in a PCO or ePCO IE with an indication that a semantic error exists in the QoS operation. In some embodiments, the PCO or ePCO IE may be transmitted in a MODIFY EPS BEARER CONTEXT ACCEPT message.

In some embodiments, the QoS information, the QoS identifier, and the bearer context associated with the QoS information may be included in an ACTIVATE DEFAULT EPS BEARER CONTEXT REQUEST or ACTIVATE DEDICATED EPS BEARER CONTEXT REQUEST message. The flow description operation may specify that the UE is to create a new QoS flow operation. If a QoS flow description exists with the same QoS flow identifier as that included in the message and the QoS flow identifier is stored for an EPS bearer context different from the EPS bearer context identified in the message (i.e., the EPS bearer context being activated), the UE may not perform the flow description operation and may discard the flow description operation. The UE may report an error to a network entity. The error may be carried, for example, in a PCO or ePCO IE with an indication that a semantic error exists in the QoS operation. In some embodiments, the PCO or ePCO IE may be transmitted in an ACTIVATE DEFAULT EPS BEARER CONTEXT ACCEPT message or an ACTIVATE DEDICATED EPS BEARER CONTEXT ACCEPT message.

In some embodiments, the MODIFY EPS BEARER CONTEXT REQUEST message, the ACTIVATE DEFAULT EPS BEARER CONTEXT REQUEST, or the ACTIVATE DEDICATED EPS BEARER CONTEXT REQUEST message may be used to generate a new QoS rule associated with a given QoS identifier. If there is already an existing QoS rule associated with the QoS identifier and that the QoS identifier is not associated with a bearer context, the UE can discard the received QoS information and generate an error message indicating that the QoS information was discarded. As discussed, the error message may be transmitted by the UE to a network entity, for example, in a PCO or ePCO IE with an indication that a semantic error exists in the QoS operation.

Figure 7:
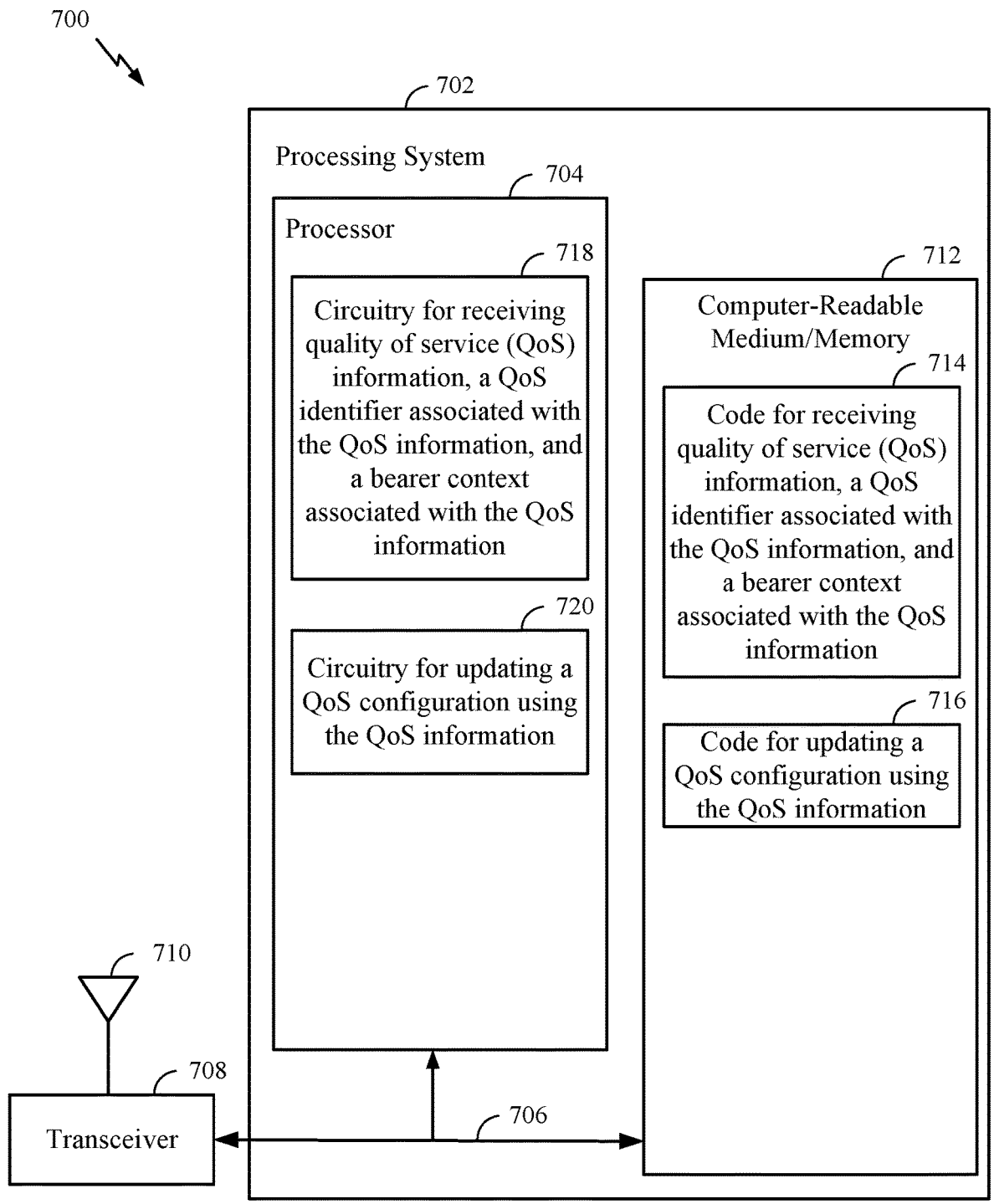
FIG. 7 illustrates a communications device that may include various components configured to perform operations for the techniques disclosed herein in accordance with aspects of the present disclosure.

FIG. 7 illustrates a communications device 700 that may include various components (e.g., corresponding to means-plus-function components) configured to perform operations for the techniques disclosed herein, such as the operations illustrated in FIG. 6. The communications device 700 includes a processing system 702 coupled to a transceiver 708. The transceiver 708 is configured to transmit and receive signals for the communications device 700 via an antenna 710, such as the various signals as described herein. The processing system 702 may be configured to perform processing functions for the communications device 700, including processing signals received and/or to be transmitted by the communications device 700.

The processing system 702 includes a processor 704 coupled to a computer-readable medium/memory 712 via a bus 706. In certain aspects, the computer-readable medium/memory 712 is configured to store instructions (e.g., computer-executable code) that when executed by the processor 704, cause the processor 704 to perform the operations illustrated in FIG. 6, or other operations for performing the various techniques discussed herein to update a QoS configuration based on mapped 5GS QoS information. In certain aspects, computer-readable medium/memory 712 stores code 714 for receiving quality of service (QoS) information, a QoS identifier associated with the QoS information, and a bearer context associated with the QoS information; and code 716 for updating a QoS configuration using the QoS information. The processor 714 includes circuitry 718 for receiving quality of service (QoS) information, a QoS identifier associated with the QoS information, and a bearer context associated with the QoS information; and circuitry 720 for updating a QoS configuration using the QoS information.

Example Clauses

Clause 1: A method for wireless communications by a user equipment (UE), comprising: receiving, from a network entity, quality of service (QoS) information, a QoS identifier associated with the QoS information, and a bearer context associated with the QoS information in one of a modify bearer context request message, an activate default bearer context request message, or an activate dedicated bearer context request message, wherein the QoS information comprises parameters for a first radio access technology mapped to corresponding parameters for a second radio access technology; and updating a QoS configuration using the QoS information based on whether the UE is already configured with QoS information associated with the QoS identifier for a bearer context different from the bearer context associated with the QoS information received in the modify bearer context request message, activate default bearer context request message, or activate dedicated bearer context request message.

Clause 2: The method of Clause 1, wherein the bearer context different from the bearer context associated with the received QoS information belongs to a same packet data network (PDN) connection as the bearer context associated with the received QoS information.

Clause 3: The method of Clauses 1 or 2, wherein the QoS identifier comprises a QoS rule identifier.

Clause 4: The method of Clause 3, wherein updating the QoS configuration comprises: determining that an existing QoS rule is associated with the QoS identifier and that the QoS identifier is associated with a QoS flow description stored for a bearer context different from the bearer context associated with the QoS information received in the modify bearer context request message, activate default bearer context request message, or activate dedicated bearer context request message; discarding the received QoS information; and generating an error message indicating that the received QoS information was discarded.

Clause 5: The method of Clauses 1 or 2, wherein: the modify bearer context request message, the activate default bearer context request message, or the activate dedicated bearer context request message includes an indication to create a new QoS rule; and updating the QoS configuration comprises: determining that an existing QoS rule is associated with the QoS identifier and that the QoS identifier is not associated with a bearer context; discarding the received QoS information; and generating an error message indicating that the received QoS information was discarded.

Clause 6: The method of any of Clauses 1 through 5, wherein the QoS identifier comprises a QoS flow identifier.

Clause 7: The method of Clause 6, wherein updating the QoS configuration comprises: determining that an existing QoS flow description is associated with the QoS identifier and that the QoS identifier is associated with a bearer context different from the bearer context associated with the QoS information received in the modify bearer context request message, activate default bearer context request message, or activate dedicated bearer context request message; discarding the received QoS information; and generating an error message indicating that the received QoS information was discarded.

Clause 8: An apparatus, comprising: a memory; and a processor configured to perform the operations of any of Clauses 1 through 7.

Clause 9: An apparatus, comprising: means for performing the operations of any of Clauses 1 through 7.

Clause 10: A computer-readable medium having instructions stored thereon which, when executed by a processor, performs the operations of any of Clauses 1 through 7.

Additional Considerations

The techniques described herein may be used for various wireless communication technologies, such as NR (for example, 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, or 5G wireless technologies, aspects of the present disclosure can be applied in other generation-based communication systems.

In 3GPP, the term "cell" can refer to a coverage area of a Node B (NB) or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, or other types of cells. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having an association with the femto cell (for example, UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (for example, a smart ring, a smart bracelet, etc.), an entertainment device (for example, a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, which may be narrowband IoT (NB-IoT) devices.

Some wireless networks (for example, LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (for example, 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (for example, 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (for example, a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (for example, one or more other UEs), and the other UEs may utilize the resources scheduled by the UE for wireless communication.

In some examples, a UE may function as a scheduling entity in a peer-to-peer (P2P) network, or in a mesh network. In a mesh network example, UEs may communicate directly with one another in addition to communicating with a scheduling entity.

As used herein, the term "determining" may encompass one or more of a wide variety of actions. For example, "determining" may include calculating, computing, processing, deriving, investigating, looking up (for example, looking up in a table, a database or another data structure), assuming and the like. Also, "determining" may include receiving (for example, receiving information), accessing (for example, accessing data in a memory) and the like. Also, "determining" may include resolving, selecting, choosing, establishing and the like.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram.

However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The invention claimed is:

1. A method for wireless communications by a user equipment (UE), comprising:
    receiving, from a network entity, quality of service (QoS) information, a QoS identifier associated with the QoS information, and a bearer context associated with the QoS information in a request message, wherein the QoS information comprises parameters for a first radio access technology mapped to corresponding parameters for a second radio access technology; and
    discarding a QoS configuration using the QoS information when the UE is already configured with QoS information associated with the QoS identifier for a bearer context different from the bearer context associated with the QoS information received in the request message, wherein discarding the QoS configuration comprises:
        determining that an existing QoS rule is associated with the QoS identifier and that the QoS identifier is associated with a QoS flow description stored for a bearer context different from the bearer context associated with the QoS information received in the request message;
        discarding the received QoS information; and
        generating an error message indicating that the received QoS information was discarded.

2. The method of claim 1, wherein the request message comprises one of a modify bearer context request message, an activate default bearer context request message, or an activate dedicated bearer context request message.

3. The method of claim 1, wherein the bearer context different from the bearer context associated with the received QoS information belongs to a same packet data network (PDN) connection as the bearer context associated with the received QoS information.

4. The method of claim 1, wherein the QoS identifier comprises a QoS rule identifier.

5. The method of claim 1, wherein:
    the request message includes an indication to create a new QoS rule; and
    discarding the QoS configuration comprises:
        determining that an existing QoS rule is associated with the QoS identifier and that the QoS identifier is not associated with a bearer context;
        discarding the received QoS information; and
        generating an error message indicating that the received QoS information was discarded.

6. The method of claim 1, wherein the QoS identifier comprises a QoS flow identifier.

7. The method of claim 6, wherein discarding the QoS configuration comprises:
    determining that an existing QoS flow description is associated with the QoS identifier and that the QoS identifier is associated with a bearer context different from the bearer context associated with the QoS information received in the request message;
    discarding the received QoS information; and
    generating an error message indicating that the received QoS information was discarded.

8. An apparatus for wireless communications by a user equipment (UE), comprising:
    a processor configured to:
        receive, from a network entity, quality of service (QoS) information, a QoS identifier associated with the QoS information, and a bearer context associated with the QoS information in a request message, wherein the QoS information comprises parameters for a first radio access technology mapped to corresponding parameters for a second radio access technology, and
        discard a QoS configuration using the QoS information when the UE is already configured with QoS information associated with the QoS identifier for a bearer context different from the bearer context associated with the QoS information received in the request message, wherein the processor is configured to discard the QoS configuration by:
            determining that an existing QoS rule is associated with the QoS identifier and that the QoS identifier is associated with a QoS flow description stored for a bearer context different from the bearer context associated with the QoS information received in the request message;
            discarding the received QoS information; and
            generating an error message indicating that the received QoS information was discarded; and
    a memory.

9. The apparatus of claim 8, wherein the request message comprises one of a modify bearer context request message, an activate default bearer context request message, or an activate dedicated bearer context request message.

10. The apparatus of claim 8, wherein the bearer context different from the bearer context associated with the received QoS information belongs to a same packet data network (PDN) connection as the bearer context associated with the received QoS information.

11. The apparatus of claim 8, wherein the QoS identifier comprises a QoS rule identifier.

12. The apparatus of claim 8, wherein:
    the modify bearer context request message, the activate default bearer context request message, or the activate dedicated bearer context request message includes an indication to create a new QoS rule; and
    the processor is configured to discard the QoS configuration by:
        determining that an existing QoS rule is associated with the QoS identifier and that the QoS identifier is not associated with a bearer context;
        discarding the received QoS information; and
        generating an error message indicating that the received QoS information was discarded.

13. The apparatus of claim 8, wherein the QoS identifier comprises a QoS flow identifier.

14. The apparatus of claim 13, wherein the processor is configured to discard the QoS configuration by:
    determining that an existing QoS flow description is associated with the QoS identifier and that the QoS identifier is associated with a bearer context different from the bearer context associated with the QoS information received in the modify bearer context request message, activate default bearer context request message, or activate dedicated bearer context request message;

discarding the received QoS information; and generating an error message indicating that the received QoS information was discarded.

15. An apparatus for wireless communications by a user equipment (UE), comprising:
    means for receiving, from a network entity, quality of service (QoS) information, a QoS identifier associated with the QoS information, and a bearer context associated with the QoS information in a request message, wherein the QoS information comprises parameters for a first radio access technology mapped to corresponding parameters for a second radio access technology; and
    means for discarding a QoS configuration using the QoS information when the UE is already configured with QoS information associated with the QoS identifier for a bearer context different from the bearer context associated with the QoS information received in the request message, wherein the means for discarding the QoS configuration comprises:
        means for determining that an existing QoS rule is associated with the QoS identifier and that the QoS identifier is associated with a QoS flow description stored for a bearer context different from the bearer context associated with the QoS information received in the modify bearer context request message, activate default bearer context request message, or activate dedicated bearer context request message;
        means for discarding the received QoS information; and
        means for generating an error message indicating that the received QoS information was discarded.

16. The apparatus of claim 15, wherein the request message comprises one of a modify bearer context request message, an activate default bearer context request message, or an activate dedicated bearer context request message.

17. The apparatus of claim 15, wherein the bearer context different from the bearer context associated with the received QoS information belongs to a same packet data network (PDN) connection as the bearer context associated with the received QoS information.

18. The apparatus of claim 15, wherein the QoS identifier comprises a QoS rule identifier.

19. The apparatus of claim 15, wherein:
    the modify bearer context request message, the activate default bearer context request message, or the activate dedicated bearer context request message includes an indication to create a new QoS rule; and
    the means for discarding the QoS configuration comprises:
        means for determining that an existing QoS rule is associated with the QoS identifier and that the QoS identifier is not associated with a bearer context;
        means for discarding the received QoS information; and
        means for generating an error message indicating that the received QoS information was discarded.

20. The apparatus of claim 15, wherein the QoS identifier comprises a QoS flow identifier.

21. The apparatus of claim 20, wherein the means for discarding the QoS configuration comprises:
    means for determining that an existing QoS flow description is associated with the QoS identifier and that the QoS identifier is associated with a bearer context different from the bearer context associated with the QoS information received in the modify bearer context request message, activate default bearer context request message, or activate dedicated bearer context request message;
    means for discarding the received QoS information; and
    means for generating an error message indicating that the received QoS information was discarded.

22. A non-transitory computer-readable medium having instructions stored thereon which, when executed by a processor, performs an operation for wireless communications by a user equipment (UE), the operation comprising:
    receiving, from a network entity, quality of service (QoS) information, a QoS identifier associated with the QoS information, and a bearer context associated with the QoS information in a request message, wherein the QoS information comprises parameters for a first radio access technology mapped to corresponding parameters for a second radio access technology; and
    discarding a QoS configuration using the QoS information when the UE is already configured with QoS information associated with the QoS identifier for a bearer context different from the bearer context associated with the QoS information received in the request message, wherein discarding the QoS configuration comprises:
        determining that an existing QoS rule is associated with the QoS identifier and that the QoS identifier is associated with a QoS flow description stored for a bearer context different from the bearer context associated with the QoS information received in the request message;
        discarding the received QoS information; and
        generating an error message indicating that the received QoS information was discarded.

23. The non-transitory computer-readable medium of claim 22, wherein the bearer context different from the bearer context associated with the received QoS information belongs to a same packet data network (PDN) connection as the bearer context associated with the received QoS information.

24. The non-transitory computer-readable medium of claim 22, wherein the QoS identifier comprises a QoS rule identifier.

25. The non-transitory computer-readable medium of claim 22, wherein:
    the modify bearer context request message, the activate default bearer context request message, or the activate dedicated bearer context request message includes an indication to create a new QoS rule; and
    discarding the QoS configuration comprises:
        determining that an existing QoS rule is associated with the QoS identifier and that the QoS identifier is not associated with a bearer context;
        discarding the received QoS information; and
        generating an error message indicating that the received QoS information was discarded.

26. The non-transitory computer-readable medium of claim 22, wherein:
    the QoS identifier comprises a QoS flow identifier; and
    discarding the QoS configuration comprises:
        determining that an existing QoS flow description is associated with the QoS identifier and that the QoS identifier is associated with a bearer context different from the bearer context associated with the QoS information received in the modify bearer context request message, activate default bearer context request message, or activate dedicated bearer context request message;

discarding the received QoS information; and generating an error message indicating that the received QoS information was discarded.

* * * * *